June 17, 1969  H. C. HELLAND  3,450,283
TRAILER WITH DETACHABLE REAR WHEELS
Filed May 2, 1967  Sheet 1 of 2
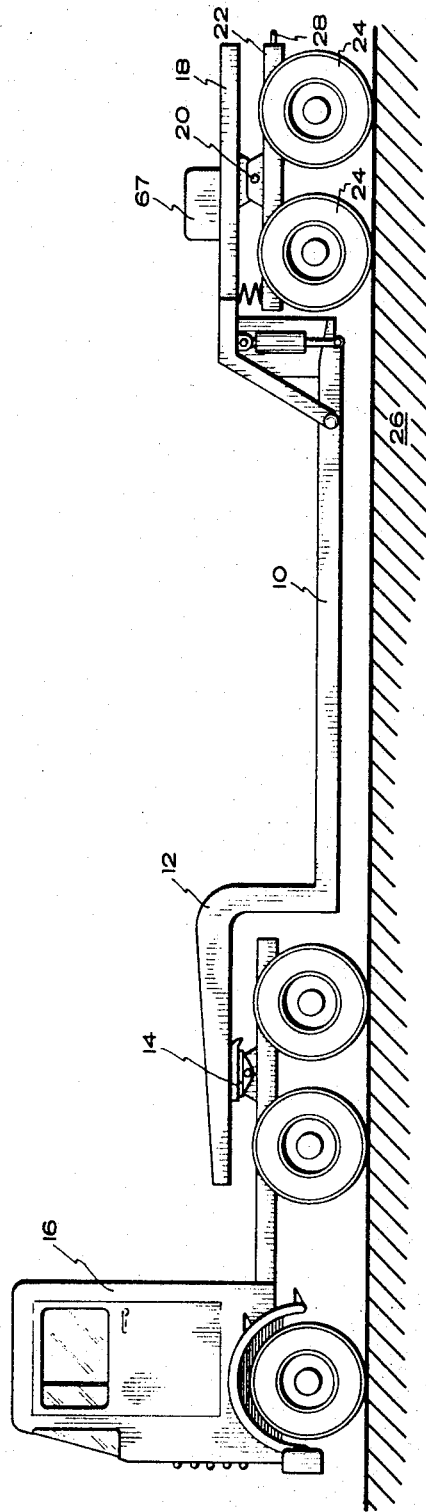
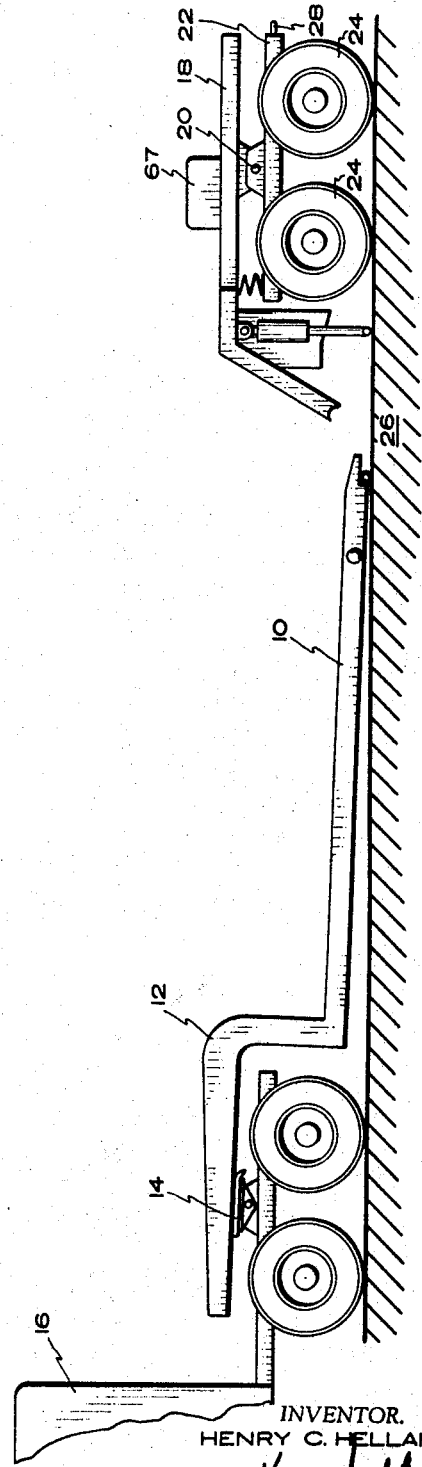
INVENTOR.
HENRY C. HELLAND
BY
HIS ATTORNEY June 17, 1969  H. C. HELLAND  3,450,283
TRAILER WITH DETACHABLE REAR WHEELS
Filed May 2, 1967  Sheet 2 of 2
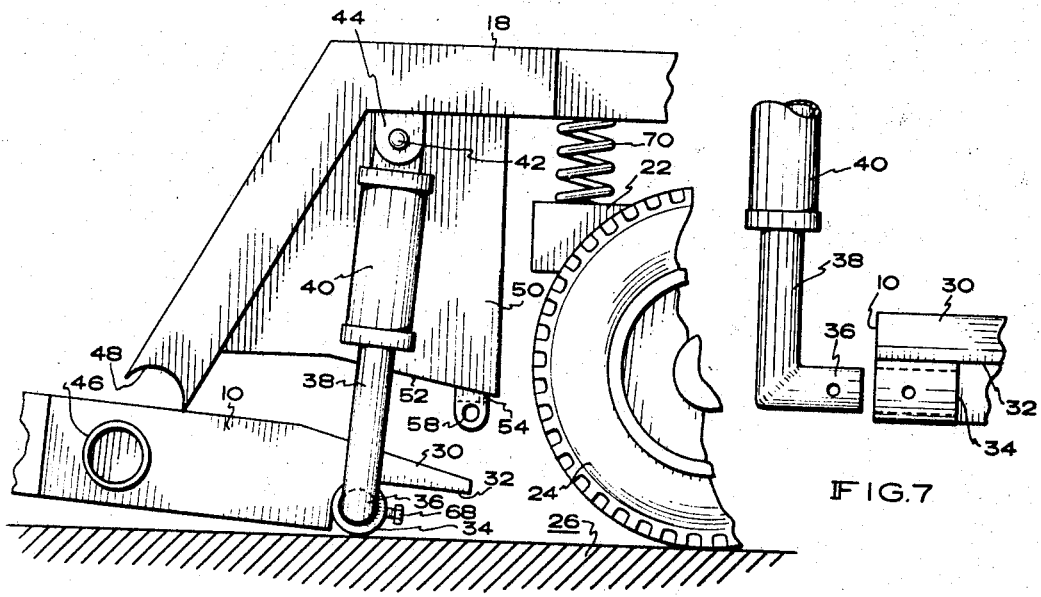
FIG. 3
FIG. 7
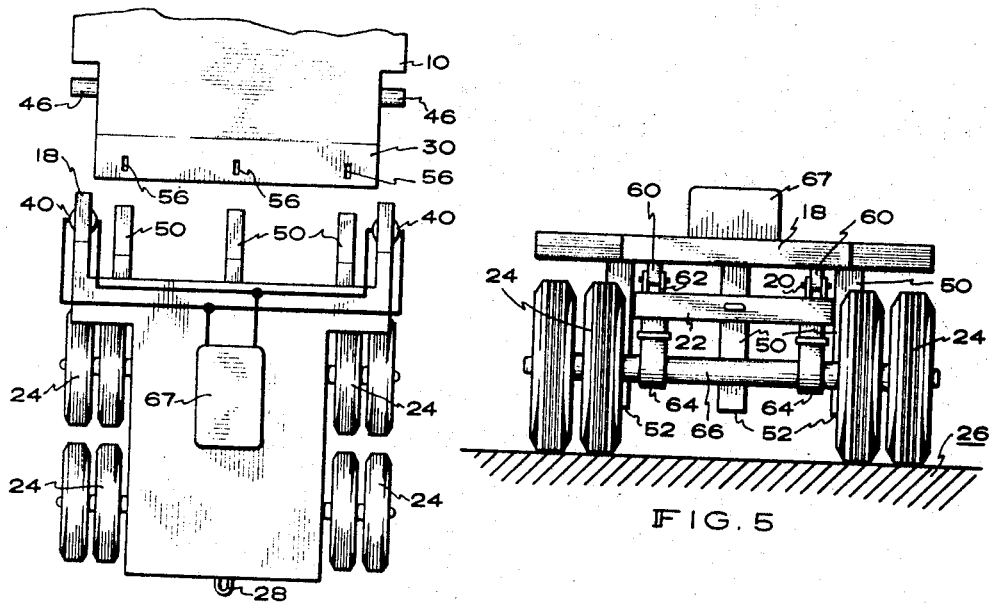
FIG. 4
FIG. 5
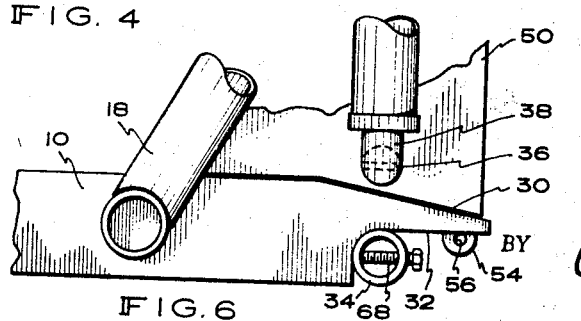
FIG. 6
INVENTOR.
HENRY C. HELLAND
BY
HIS ATTORNEY

United States Patent Office 3,450,283
Patented June 17, 1969

3,450,283
TRAILER WITH DETACHABLE REAR WHEELS
Henry C. Helland, 1138 Augusta Way,
Salt Lake City, Utah 84108
Filed May 2, 1967, Ser. No. 635,537
Int. Cl. B60p 1/04
U.S. Cl. 214—505                                    7 Claims

ABSTRACT OF THE DISCLOSURE

A low bed trailer connected at its front end to a traction vehicle and mounted at its rear end to a detachable rear gooseneck mounted on wheels. The gooseneck is provided with hydraulic pistons for raising the trailer bed and securing it in a travel position and for lowering it to ground level. The gooseneck can be mounted with springs to the wheels for absorbing road shock as the trailer is transported.

---

This invention relates to a low bed trailer with detachable rear wheels, and in particular, to a low bed trailer with means for lowering the rear end of the trailer to the ground and separating the rear wheels from the lowered trailer.

It is conventional practice to transport crawler type tractors, trucks, and other heavy machinery and equipment on trailers which are drawn with a conventional traction vehicle. Because the equipment to be transported must generally be loaded from ground level to the trailer bed and then unloaded from the trailer to ground level, it is desirabe to use low bed trailers. Such trailers are often rigidly supported on wheels without the use of springs or other shock absorbing devices which prevent wheel movement from being imparted to the trailer bed. Accordingly, trailers of this type cannot travel at high speeds over the highways and even when they are moved at a low rate of speed equipment loaded thereon is subjected to substantial pounding, vibration, and the like, which, of course, has a deleterious effect on the equipment. In addition, such trailers are difficult to load and unload since they are elevated above the ground. Attempts have been made to remedy these problems by spring mounting the trailer bed and also providing means for lowering the trailer's front end to ground level by detaching it from the gooseneck used to connect the trailer to the fifth wheel element of the traction vehicle. This construction has proved to be an unsatisfactory one since the gooseneck is pivotally connected to the fifth wheel thereby making it very difficult to align it with the detached trailer bed for connection. In addition, the traction vehicle must be provided with specific gooseneck elevating equipment whenever it is used to transport a trailer with a detachable gooseneck.

It is the principal object of this invention to provide a low bed trailer which can be detached from its rear wheels and lowered to the ground to facilitate easy loading and unloading of equipment and machinery transported on the trailer bed.

Another object of this invention is to provide a trailer with detachable rear wheels and with means for lowering the bed of the trailer to ground level and for raising the bed from said level to transportable position.

A still further object of this invention is to provide a low bed trailer which is easily detached from its rear wheels, which is inexpensive to construct, and which is simple in design.

Still further objects of this invention will become apparent to those skilled in the art as the invention is better understood by reference to the detailed description appearing hereinafter.

Briefly, the invention comprises a trailer mounted at its rear end on wheels and connected at its front end to a traction vehicle. The trailer is adapted to be disengaged from the rear wheels and lowered to the ground level with lifting means secured to the rear wheels. When the bed has been lowered to ground level the rear wheels detach from the trailer bed and are easily rolled away from the bed thereby facilitating loading and unloading of the trailer. Preferably, the trailer bed is connected to a rear gooseneck which is journaled on a frame connected with road shock absorbing means to the rear wheels.

So that the invention may be more readily understood and carried into effect, reference is made to the accompanying drawings, which are offered by way of example only and are not to be taken as limiting the invention, the scope of which is defined by the appended claims, which obviously embrace equivalent structures and processes.

In the drawings:

FIG. 1 is a plan elevation view of the low bed trailer of this invention shown mounted in a transportable position on rear wheels and attached at its front end to the fifth wheel of a traction vehicle.

FIG. 2 is a plan elevation view of the low bed trailer of this invention detached from its rear wheels so that the trailer is in a loading or unloading position.

FIG. 3 is an enlarged plan view of the preferred trailer bed elevating means used to separate the trailer bed from the rear gooseneck.

FIG. 4 is a top view of the trailer of this invention separated from its rear wheels.

FIG. 5 is an end view of the rear wheels of the trailer showing the wheels mounted to the trailer with shock absorbing springs.

FIG. 6 is an enlarged view of the connection between the trailer bed and the rear gooseneck when the trailer is in a transportable configuration.

FIG. 7 is an enlarged view of the connecting end of the piston rod and its relationship to the sleeve adapted to receive the connecting end.

Referring now more specifically to the drawings, in FIG. 1 there is shown a low bed trailer 10 with front gooseneck 12 connected to fifth wheel 14 of traction vehicle 16 in a conventional fashion. The rear of bed 10 is connected to rear gooseneck 18 in a fashion, hereinafter described in detail, which allows the gooseneck and bed to be separated from each other. Said gooseneck 18 is journaled to frame 22 which frame is connected to axles 66 with road shock absorbing springs. The axles support at least one pair, and preferably two pair, of conventional wheels 24.

As shown in FIG. 2, rear gooseneck 18 can be separated from bed 10 thereby allowing the rear of the bed to be dropped to ground 26. When the trailer bed is in this position, the rear wheels are easily rolled away from the bed by connecting hitch 28, secured to frame 22, to a pickup truck or the like. Heavy equipment and machinery can then be driven or otherwise loaded onto and off of the bed.

Enlarged views of the preferred device for connecting trailer bed 10 to rear gooseneck 18 are shown in FIGS. 3 and 6. FIG. 3 illustrates the rear gooseneck 18 separated from the trailer bed as the bed is being lowered to ground level and FIG. 6 illustrates gooseneck 18 joined to bed 10 when said bed is in a travel position. As shown, the rear end of bed 10 is preferably provided with an angled upper edge 30 for more easily loading and unloading equipment onto and off of the bed. A notched bottom segment 32 is positioned under the angled upper edge 30 and a sleeve 34 is secured in the notched segment for receiving inwardly extending shaft 36 secured to the end of piston rod 38. Said piston rod 38 is connected to a conventional hydraulic piston in a hydraulic cylinder 40 and is used to raise and lower bed 10 as it is being attached to or detached from rear gooseneck 18. Cylinder 40 is pivotally connected at its top end with shaft 42 which is passed through bracket 44 attached to rear gooseneck 18. A cylinder 40 with associated equipment is preferably provided on each side of the trailer bed to provide means for uniformly lifting or lowering both sides of the trailer.

A member 46 extends outwardly from each of the opposite sides of trailer bed 10 to coact with bottom support surface 48 of rear gooseneck 18 when bed 10 is raised to a travel position. Member 46 is preferably circular in cross-section so that support surface 48 will freely rotate over the member as bed 10 is moved to a travel position. However, it is to be noted that any construction can be used which allows a rotational movement with respect to the connection between the lower end of gooseneck 18 and trailer bed 10. When the trailer is in a travel position it is supported against bottom surface 52 of support members 50. Said bottom surface 52 is preferably shaped to conform with the bed's angled surface 20 and with the plane top surface of said bed. A connecting bracket is shaped to pass through a port 56 in bed 10 and be retained therein when shaft 56 is positioned in port 58 in said bracket 54. Of course, piston rod 38 with its inwardly extending end 36 can also be used to support bed 10 against the bottom surface 52 of support member 50.

Rear gooseneck 18 is journaled to frame 22 with shaft 20 which is passed through a ported member 60 secured to said rear gooseneck and through brackets 62 secured to said frame 22. Frame 22 is in turn mounted on conventional springs 64 secured to axles 66 upon which two sets of wheels 24 are mounted thereby supporting frame 22 in a predetermined plane. When hydraulic lifting cylinders of the type described are used to elevate and lower bed 10 such cylinders may be activated with the hydraulic system of the traction vehicle or an independent system 67 can be provided which is mounted on gooseneck 18. In such event, the independent system is connected in the well known manner shown in FIG. 4, with hydraulic lines, to hydraulic cylinders 40.

When the trailer is in a travel configuration it is adapted to be transported at high speeds since it is spring mounted to both front and rear wheels. When it is desired to load or unload the trailer, shaft 56 is removed from port 58 and hydraulic cylinder 40 is activated to extend piston rod 54. When this occurs, rear gooseneck 18 is pulled to an angle with respect to frame 22 and outwardly extending member 46 rotates with respect to bottom support surface 48 of said gooseneck 18. This motion continues until the rear end of trailer bed 10 is supported on ground 26 at which time further movement of piston rod 36 urges support surface 48 away from member 46. Safety pin 68 is then removed from shaft 36 and sleeve 34 whereupon piston rods 38 can be pulled outwardly away from trailer bed 10 to remove shaft 36 from sleeve 34. Biasing means such as spring 70 is preferably provided between frame 22 and rear gooseneck 18 to urge the lower end of gooseneck 18 to move to a position above ground 26 when the gooseneck is detached from the trailer bed. When the gooseneck is thus positioned it can be easily moved away from the end of bed 10 with a traction vehicle which is connected to hitch 28. The trailer bed is then easily loaded or unloaded by merely driving vehicles over its lowered end or by sliding other equipment over said lowered end.

When it is desired to reconnect the rear wheels to the trailer bed gooseneck 18 is moved so that shaft 36 can be urged into sleeve 34. Safety pin 68 is then urged into the port provided in shaft 36 and sleeve 34 to lock the shaft to bed 10. Thereafter piston rod 38 is retracted into hydraulic cylinder 40 whereupon members 46 are urged against the bottom support surfaces 48 of gooseneck 18. As said piston rod continues to move into cylinder 40, surface 52 of support member 50 is urged against the top surface of bed 10 thereby raising bed 10 above ground level to a travel position. When the bed is in this position shaft 56 is urged into ports 58 of support brackets 54 thereby fixedly connecting said bed 10 to gooseneck 18.

Whereas there is here illustrated and specifically described a certain preferred apparatus which is presently regarded as the best mode of carrying out this invention, it should be understood that various changes may be made and other construction adopted without departing from the inventive subject matter. For example, while the use of hydraulic pistons and cylinders has been specifically described as the means used for elevating and lowering the trailer bed, it is within the scope of this invention to use any conventional elevation means such as a screw jack, a winch, and the like.

I claim:

1. A trailer, adapted to be pulled with a traction vehicle, which comprises: a trailer bed having a front end and an opposite rear end; attaching means secured to said trailer bed proximate said front end for pivotally attaching said trailer bed to said traction vehicle; rear gooseneck means journaled to a wheeled support frame to rock upwardly and downwardly on said frame and coact with said trailer bed proximate said rear end for fixedly securing said frame means to said trailer bed; elevating and lowering means connected to said rear gooseneck means and coacting with said rear end of said trailer bed for lowering said rear end of said trailer bed from a transportable position to ground level and for lifting said rear end of said trailer bed from ground level to said transportable position; and positioning means connected to said wheeled support frame for supporting said rear gooseneck means above ground level when said rear gooseneck means is detached from said trailer bed.

2. The trailer of claim 1 wherein said elevating and lowering means comprises at least one retractable and expandable support member, connected to said rear gooseneck, with means for connecting said member to said trailer bed proximate said rear end.

3. The trailer of claim 2 wherein said expandable support member comprises a piston, powered with a cylinder in communication with a source of pressurized fluid, positioned on opposite sides of said rear gooseneck.

4. The trailer of claim 1 wherein a front gooseneck is connected to the trailer bed proximate said front end for connecting said trailer bed to the fifth wheel of said traction vehicle.

5. The trailer of claim 2 wherein said retractable and expandable support member is a piston which is powered in a cylinder in communication with a source of pressurized fluid.

6. The trailer of claim 4 wherein said rear gooseneck is spring mounted to said rear wheels.

7. The trailer of claim 6 wherein said rear gooseneck is provided with locking means for locking said rear end of said bed to said rear gooseneck when said bed is in a transportable position.

References Cited

UNITED STATES PATENTS

| 2,350,841 | 6/1944 | Troche et al. |
| 2,944,834 | 7/1960 | Hill. |
| 3,151,884 | 10/1964 | Felburn. |

FOREIGN PATENTS

| 964,833 | 5/1957 | Germany. |

ALBERT J. MAKAY, *Primary Examiner.*

U.S. Cl. X.R.

280—425